(12) United States Patent
Akbari et al.

(10) Patent No.: US 12,404,038 B2
(45) Date of Patent: Sep. 2, 2025

(54) VEHICLE HAVING DRONE DOCKING STATION

(71) Applicant: FCA US LLC, Auburn Hills, MI (US)

(72) Inventors: Payam Akbari, LaSalle (CA); Adam Goodes, Rochester Hills, MI (US); David W Smith, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 214 days.

(21) Appl. No.: 18/186,393

(22) Filed: Mar. 20, 2023

(65) Prior Publication Data
US 2024/0317430 A1 Sep. 26, 2024

(51) Int. Cl.
| | |
|---|---|
| *B64U 70/93* | (2023.01) |
| *B60J 7/11* | (2006.01) |
| *B60K 35/00* | (2024.01) |
| *B60P 3/11* | (2006.01) |
| *B64F 1/36* | (2024.01) |
| *G05D 1/00* | (2024.01) |

(52) U.S. Cl.
CPC ............... *B64U 70/93* (2023.01); *B60J 7/11* (2013.01); *B60K 35/00* (2013.01); *B60P 3/11* (2013.01); *B64F 1/362* (2013.01); *G05D 1/101* (2013.01); *B60K 2360/48* (2024.01)

(58) Field of Classification Search
CPC ...... G05D 1/101; G05D 1/00; G05D 2103/00; B60K 35/00; B60K 2360/48; B60K 35/10; B60K 35/55; B60K 35/60; B60K 35/70; B60K 35/80; B60K 35/81; B60K 35/85; B60K 35/90; B60P 3/11; B64U 80/86; B64U 70/93; B64U 10/00; B64U 70/00; B60J 7/11; B64F 1/362; B64F 1/35; B64F 1/352; B64C 1/00; B64C 1/0009; B64C 1/06; B64C 1/061; B64C 1/062; B64C 1/063; B64C 1/064; B64C 1/065; B64C 1/068; B64C 1/069; B64C 27/08; B64C 27/10; B64C 27/20; B64C 39/00; B64C 39/001; B64C 39/003; B64C 39/005; B64C 39/006; B64C 39/008; B64C 39/02; B64C 39/024; B64C 39/029

See application file for complete search history.

(56) References Cited

U.S. PATENT DOCUMENTS

| | | |
|---|---|---|
| 10,152,059 B2 | 12/2018 | Banerjee et al. |
| 2018/0101173 A1* | 4/2018 | Banerjee .............. G05D 1/0684 |
| 2020/0062388 A1* | 2/2020 | Morales Bolaños ........ G05D 1/0088 |
| 2020/0062419 A1* | 2/2020 | Jimenez Hernandez .................... B64U 50/38 |
| 2020/0102093 A1* | 4/2020 | Claridge .................. B64F 1/22 |

(Continued)

*Primary Examiner* — Navid Z. Mehdizadeh
*Assistant Examiner* — Jared C Bean
(74) *Attorney, Agent, or Firm* — Jeremy J. Klobucar

(57) ABSTRACT

A vehicle that includes a docking station positioned within the interior of the vehicle, and a drone that is configured to mate with the docking station. The vehicle includes an electronic control unit (ECU) that is located within the interior of the vehicle and is configured to communicate instructions to a docking station controller to instruct the drone to disengage from the docking station and perform flight operations. Additionally, the vehicle ECU is configured to communicate instructions to the docking station controller to instruct the drone to cease flight operations and return to and mate with the docking station.

18 Claims, 6 Drawing Sheets

(56) References Cited

U.S. PATENT DOCUMENTS

| | | | |
|---|---|---|---|
| 2021/0255636 A1* | 8/2021 | Kerzner | G05D 1/0027 |
| 2021/0276735 A1* | 9/2021 | Raptopoulos | A47G 29/14 |
| 2023/0167653 A1* | 6/2023 | Waters | G08G 5/0013 |
| | | | 244/114 R |

* cited by examiner

VEHICLE HAVING DRONE DOCKING STATION

FIELD

The present disclosure relates to a vehicle having a drone docking station.

BACKGROUND

This section provides background information related to the present disclosure which is not necessarily prior art.

Drones are used in a wide range of applications such as aerial photography, surveillance, delivery, and inspection. Drones can be used in a variety of environments, including urban, rural, and remote areas. Drones have limited battery life, however, and the range of the drone is limited by this battery life. Moreover, drones may need a flat, safe takeoff and landing area, which may not be readily available in certain areas.

SUMMARY

This section provides a general summary of the disclosure and is not a comprehensive disclosure of its full scope or all of its features.

According to a first aspect of the present disclosure, there is provided a vehicle that includes a vehicle body defining an interior. A vehicle electronic control unit (ECU) is located within the interior of the vehicle. A docking station is positioned within the interior of the vehicle and includes a docking station controller configured to communicate with the vehicle ECU. A drone is configured to mate with the docking station that is configured to fly. The drone includes a drone controller configured to communicate with the docking station. The vehicle ECU is configured to communicate instructions to the docking station controller to instruct the drone to disengage from the docking station and perform flight operations. The vehicle ECU is further configured to communicate instructions to the docking station controller to instruct the drone to cease flight operations and return to and mate with the docking station.

According to the first aspect, the drone includes a battery, and the docking station is configured to electrically charge the battery when the drone is mated with the docking station.

According to the first aspect, the vehicle comprises a plurality of sensors that communicate various information to the vehicle ECU, and the vehicle ECU is configured to communicate the information to the docking station controller.

According to the first aspect, the docking station controller is configured to determine whether to permit the drone to disengage from the docking station based on the information provided by the sensors and communicated from the vehicle ECU, and determine whether to instruct the drone to cease flight operations and return to and mate with the docking station based on the information provided by the sensors and communicated by the vehicle ECU.

According to the first aspect, the vehicle ECU is configured to communicate with a network and receive weather information from the network, and communicate the weather information to the docking station controller.

According to the first aspect, the docking station controller is configured to determine whether to permit the drone to disengage from the docking station based on the weather information and communicated from the vehicle ECU, and determine whether to instruct the drone to cease flight operations and return to and mate with the docking station based on the weather information and communicated by the vehicle ECU.

According to the first aspect, the drone controller is configured to communicate with a remote operating device.

According to the first aspect, the vehicle ECU is configured to communicate with the remote operating device.

According to the first aspect, the vehicle includes a graphic user interface (GUI) that communicates with the vehicle ECU, the GUI being configured to be manipulated by an occupant of the vehicle to instruct the vehicle ECU to communicate with the docking station controller to instruct the drone to perform the flight operations or cease the flight operations.

According to the first aspect, the interior includes a cargo bin having a movable lid to provide and prevent access to the cargo bin, the docking station being located in the cargo bin.

According to the first aspect, the vehicle body includes an opening that is configured to permit the drone to enter and exit the vehicle.

According to the first aspect, the opening is a sun roof or a moon roof.

According to the first aspect, the vehicle includes a removable roof, and when the roof is removed from the vehicle the drone is permitted to exit and enter the vehicle.

According to a second aspect of the present disclosure, there is provided a method for operating a drone using the vehicle described above. The method may include receiving, by the vehicle ECU, a request to initiate the flight operations from either a graphic user interface (GUI) of the vehicle or a remote operating device. Based on the request received by the vehicle ECU to initiate the flight operations, the ECU is configured to communicate with vehicle sensors and/or a network in communication with the ECU to determine whether weather conditions are suitable to conduct the flight operations, and based on signals generated by the vehicle sensors that are indicative of the weather conditions and/or information received from the network that are indicative of the weather conditions, the vehicle ECU is configured to communicate instructions to the docking station controller either to permit the drone to conduct the flight operations or prevent the drone from conducting the flight operations.

According to the second aspect, after the vehicle ECU receives the request to initiate the flight operations, the method further comprises determining whether the vehicle is in motion and, based on a determination whether the vehicle is in motion, the vehicle ECU is configured to communicate instructions to the docking station controller either to permit the drone to conduct the flight operations or prevent the drone from conducting the flight operations.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
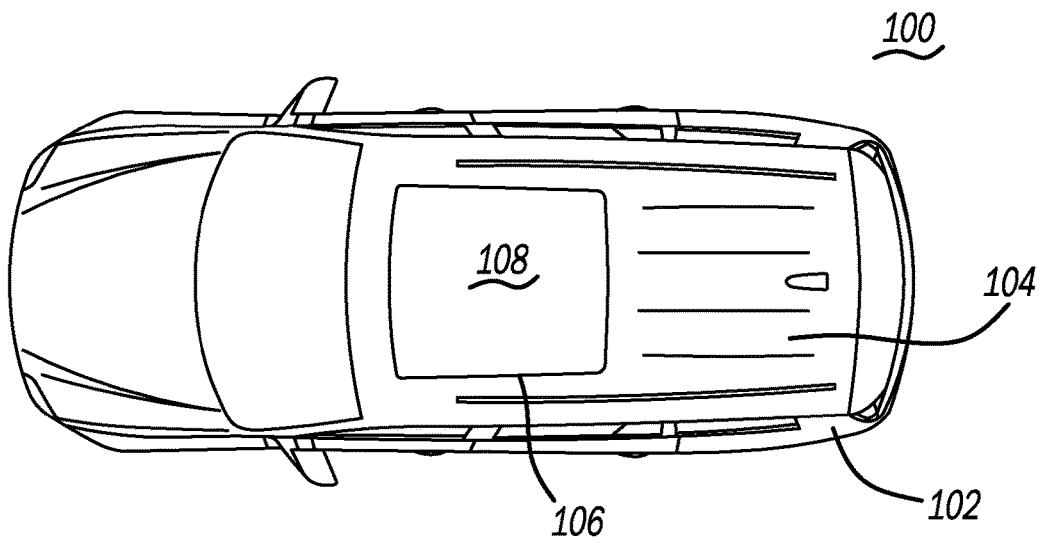
FIG. 1 is an overhead view of a vehicle according to a principle of the present disclosure.

FIG. 1 illustrates an example vehicle 100 that may include a drone docking station 304 (FIG. 3) according to the present disclosure. Vehicle 100 has a body 102 defining a roof 104. In the illustrated embodiment, roof 104 may define an opening 106. Opening 106 may include, for example, a glass panel 108 defining a sun roof, a moon roof, or a panoramic roof that permits light to enter the vehicle. Panel 108 does not necessarily need to be formed of glass or a transparent material. In contrast, panel 108 may be an opaque removable roof panel. In either case, it should be understood that panel 108 is movable to provide access to an interior 200 (FIG. 2) of vehicle 100.

Figure 2:
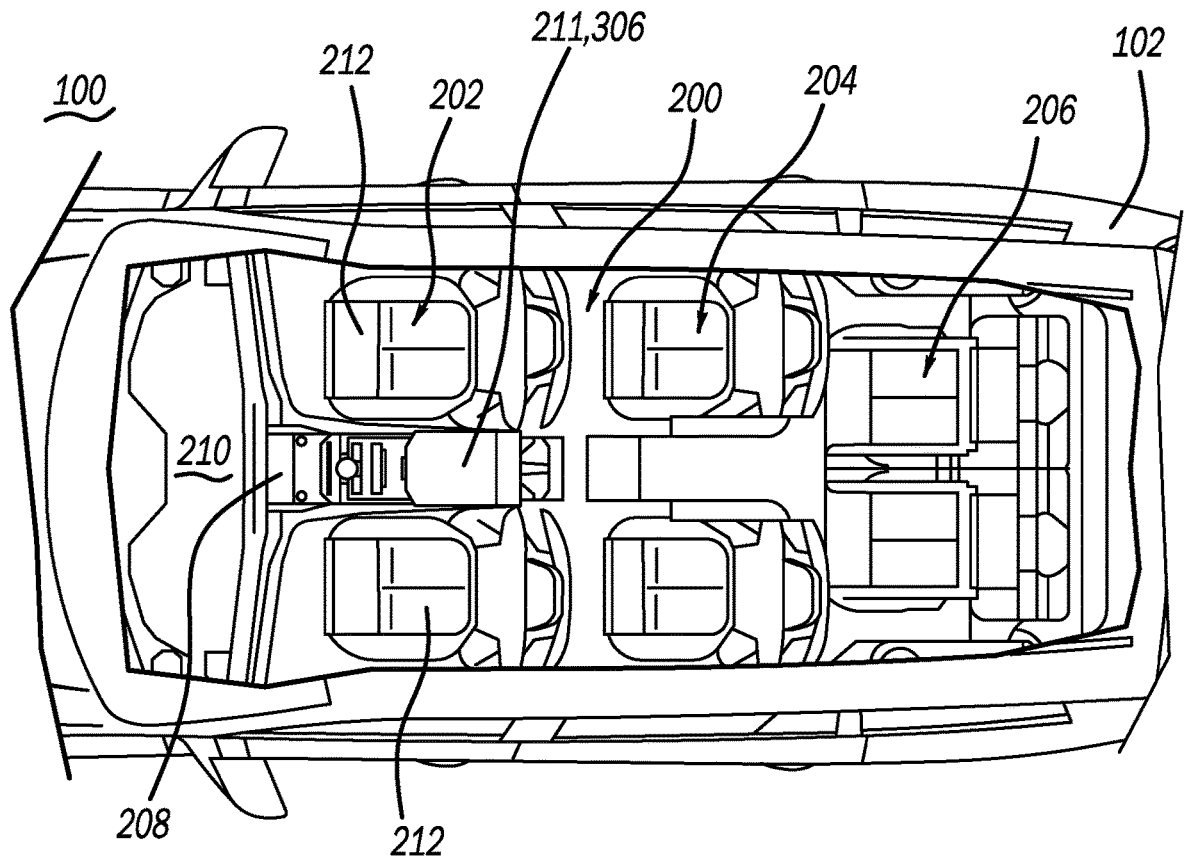
FIG. 2 is an overhead view of an interior of the vehicle illustrated in FIG. 1.

FIG. 2 illustrates an example interior 200 of vehicle 100. In the illustrated example, interior 200 includes a front row of seats 202, a second row of seats 204, and a third row of seats 206. It should be understood, however, that second and third rows of seats 204 and 206 may be omitted such that vehicle includes a rear cargo storage area in place thereof. Interior 200 may also include a graphic user interface (GUI) 208 on a dashboard 210 of vehicle 100 that is in communication with an electronic control unit 402 (FIG. 4) of vehicle 100. Interior 200 may include a cargo bin 211 located proximate GUI 208 between the seats 212 of first row 202.

Figure 3:
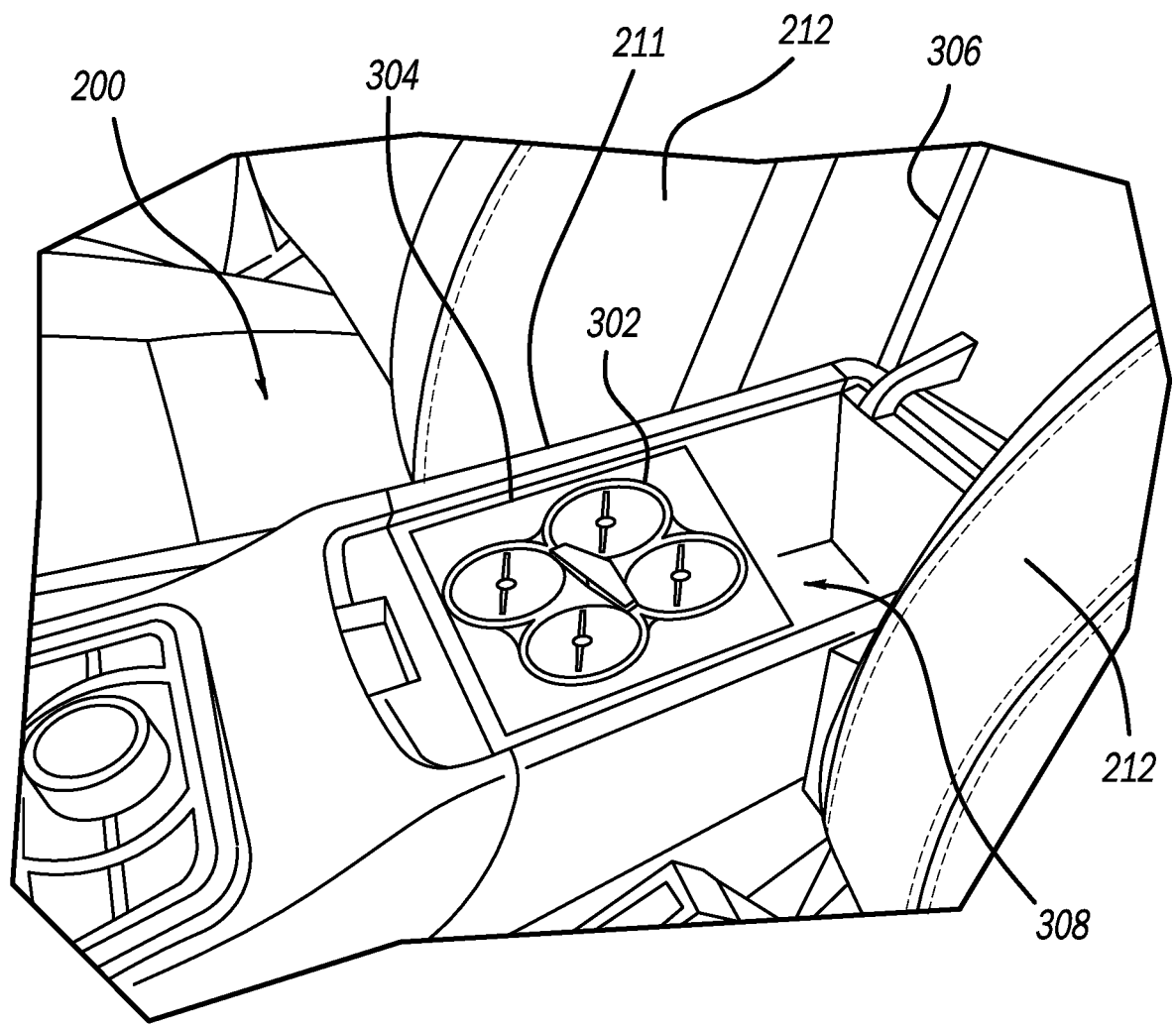
FIG. 3 is a perspective view of an example drone docking station having a drone mounted thereto, located within the interior of the vehicle illustrated in FIG. 2.

As best shown in FIG. 3, cargo bin 211 may have a movable lid 306 that may be opened to expose and provide access to a storage area 308 of cargo bin 202, and closed to enclose and prevent access to storage area 308, as is known in the art. In accordance with the present disclosure, storage area 308 may include a docking station 304 configured to mate with a drone 302. As will be described in more detail later, lid 306 may be opened to permit drone 302 to detach from docking station 304 and exit the storage area 308 while being controlled by an operator. Alternatively, the operator may simply open lid 306, manually detach drone 302 from docking station 304, manually remove drone 302 from vehicle 100, and then operate drone 302. If operator elects to control drone 302 remotely to exit storage area 308 and vehicle 100, the operator may first open or remove panel 108 located on roof 104 of vehicle 100 to permit drone 302 to exit vehicle 100 via flight.

Figure 4:
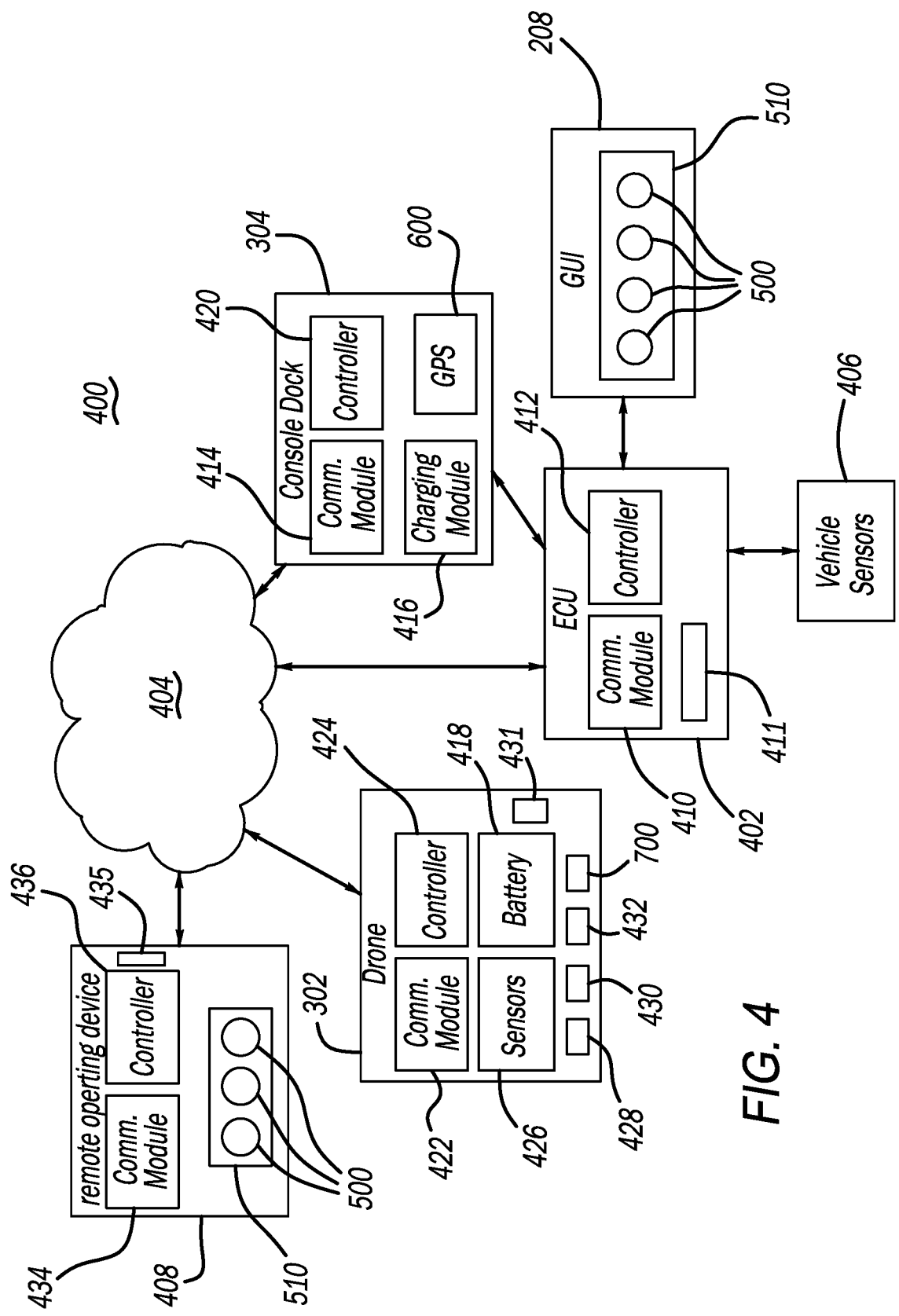
FIG. 4 is a schematic diagram depicting a vehicle system including a drone docking system according to a principle of the present disclosure.

Now referring to FIG. 4, a schematic representation of a vehicle system 400 for controlling drone 302 that includes drone docking station 304 is illustrated. In addition to docking station 304, system 400 may include ECU 402, GUI 208, a communication network 404, various vehicle sensors 406, and an optional remote operating device 408. Example remote operating devices 408 include remote controllers, mobile phones, portable or desktop computers, electronic tablets, and the like.

ECU 402 includes a communication module 410 for communicating with various modules located throughout vehicle 100 that control various features of the vehicle such as, for example, climate control modules (not shown), vehicle exterior and interior lighting modules (not shown), engine control modules (not shown), window control modules (not shown), and the like. Communication module 410 also enables ECU 402 to communicate with GUI 208, docking station 304, and network 404. ECU 402 also includes a memory 411 such as a RAM or ROM, and a controller 412 that communicates with communication module 410, wherein controller 412 is configured to communicate various instructions to GUI 208 and docking station 304 (as well as other vehicle modules like those described above) via communication module 410.

ECU 402 is also in communication with vehicle sensors 406. Example vehicle sensors 406 that may communicate with ECU 402 include interior and exterior temperature sensors (not shown), rain sensors (not shown), exhaust gas sensors (not shown), engine load sensors (not shown), oxygen sensors (not shown), fuel level sensors (not shown), and other vehicle sensors known to one skilled in the art. Specific sensors 406 that may communicate with ECU 402 to assist with operating drone 302 include rain sensors that are configured to transmit signals indicative of whether vehicle 100 is being exposed to rain, velocity sensors that are configured to transmit signals indicative of a velocity of the vehicle 100, wiper motor sensors that are configured to transmit signals indicative of the vehicle windshield wiper blades (not shown) being operated, and accelerometer or gyro-sensors that are configured to transmit signals indicative of an acceleration of the vehicle 100 or whether the vehicle 100 is located on a slope (i.e., not located on flat ground). These sensors 406 are important because these sensors 406 can generate signals that assist in determining whether to deploy or recall drone 302, or assist in operating drone 302 when it enters or exits vehicle 100.

For example, rain sensors can communicate signals indicative of whether it is raining. Operation of drone 302 may not be desirable in adverse weather conditions. Thus, based on a signal indicative of whether it is raining transmitted by the sensor 406, ECU 402 may be configured to send an instruction to docking station 304 that either prevents drone 302 from being deployed in the adverse weather conditions, or send an instruction to docking station 304 to recall a deployed drone 302 back to the docking station 304 so as to avoid drone 302 from being operated and/or damaged by the adverse weather conditions. Windshield wiper motor sensors 406 may be used in the same manner. These operations will be described in more detail later.

It also may not be desirable to deploy drone 302 from vehicle 100, or recall drone 302 back to vehicle 100, when vehicle 100 is in motion. Accordingly, signals indicative of the velocity of vehicle 100 or an acceleration of vehicle 100 that are transmitted to ECU 402 can be used to assist in operation of drone 302. For example, if ECU 402 receives a signal indicative of the velocity or acceleration of the vehicle 100, ECU 402 may communicate an instruction to docking station 304 that prevents drone 302 from being deployed from docking station 304 while the vehicle 100 is in motion. Conversely, if drone 302 is already deployed outside of vehicle 100 and the vehicle 100 is in motion, ECU 402 can send an instruction to docking station 304, which is subsequently communicated to drone 302, that prevents drone 302 from returning to docking station 304. In this regard, it is much more difficult to return drone 302 to the docking station 304 when the vehicle 100 is in motion and such an instruction can prevent drone 302 from attempting to dock with docking station 304 while the vehicle 100 is in motion to prevent unnecessary damage to either vehicle 100 or drone 302 in such an instance.

Docking station 304 includes a docking station communication module 414 that communicates with ECU 402 and network 404, a charging module 416 that is configured to charge a battery 418 of drone 302 when drone 302 is mated with docking station 304, a docking station controller 420 that is configured to send instructions to drone 302 (via network 400 when drone 302 is deployed, or directly to drone 302 via communication module 414 when drone 302 is mated with docking station 304) and to charging module 416, and a GPS module 600. Docking station controller 420 may send instructions to charging module 416 to begin charging drone 302 when drone 302 is mated with docking station 304, or send instructions to charging module 416 to cease charging drone 302 upon receive of a signal indicative that battery 418 of drone 302 has fully charged.

Figure 6:
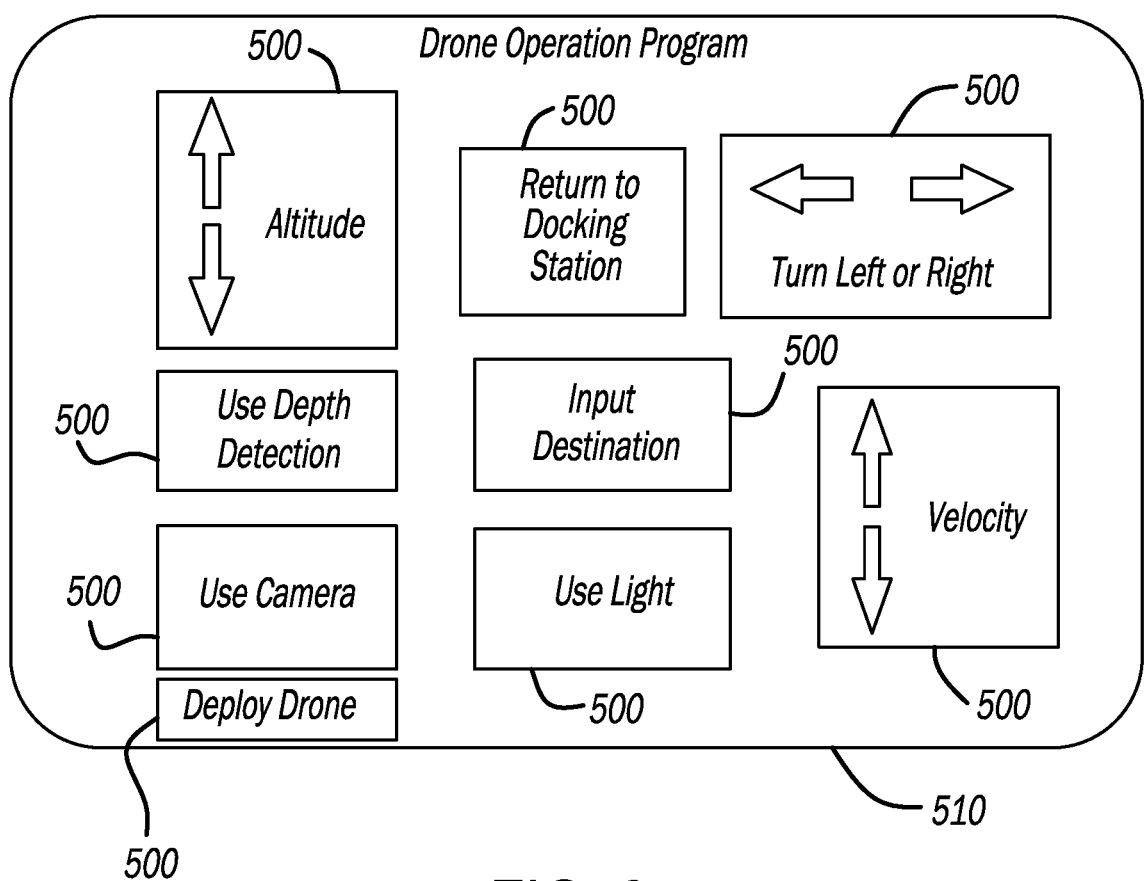
FIG. 6 is a flowchart depicting another example method for controlling a drone using the drone docking system of the present disclosure.

GUI 208 communicates with ECU 402 and may be a touch-screen operated GUI 208. As is known in the art, GUI 208 can be used to operate various systems of vehicle 100. For example, an occupant of vehicle 100 can operate a climate control system or a radio of the vehicle 100 using GUI 208 by touching various icons 500 on a screen 510 of the GUI 208. Drone 302 may be operated from GUI 208 in a similar manner. For example, if an occupant of vehicle 100 elects to deploy drone 302 from the docking station 304, GUI 208 may include various icons 500 that may be touched to operate drone 30 as best shown in FIG. 6. For example, a "deploy drone" icon 500 may be located on GUI 208 and upon the icon 500 being touched by the occupant, a signal may be sent from GUI 208 to ECU 402, which then sends a signal to docking station 304 to deploy the drone 302.

GUI 208 may also be configured to display information relative to drone 302 such as, for example and without limitation, whether drone 302 is connected to docking station 304 or whether battery 418 of drone 302 is charged (e.g., by displaying a percentage of charge remaining in battery 418). If drone 302 is in use outside of vehicle 100, GUI 208 may also be used to control movement of drone 302 (e.g., an elevation of flight, velocity of drone 302, and the like). Any instruction input into GUI 208 is communicated to ECU 402, which is then communicated to docking station 304, which is then communicated to drone 302 via network 404. An example type of GUI 208 is a Uconnect® system.

Network 404 may be a wireless communication network operating in accordance with one or more standards including, but not limited to, Wi-Fi, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), V2V (vehicle-to-vehicle), V2X (vehicle-to-anything), and/or variations thereof. In the illustrated embodiment, network 404 may independently communicate with drone 302, docking station 304, ECU 402, and remote operating device 408. Network 404 may also serve as a wireless conduit of communication between these devices.

Drone 302 includes a drone communication module 422, a drone controller 424, battery 418, various sensors 426, a memory 431 such as a RAM or ROM, and a GPS module 700. Optional components include a camera 428, a light-emitting device 430 that can be operated in a manner similar to a vehicle's headlights (e.g., to illuminate the ground beneath drone 302 during flight operations), and a depth device 432 configured to determine a depth of a puddle or other body of water. For example, depth device 432 can emit a laser, sonar, or some other type of energy that can assist in determining a depth).

Drone communication module 422 is configured to receive and transmit information from network 400 to other elements of the system such as, for example, docking station 304 and remote operating device 408. If drone 302 is mated with docking station 304, drone communication module 422 may receive and transmit information directly to docking station control module 414.

Drone sensors 426 may be similar to vehicle sensors 406. Example drone sensors 426 include an altimeter that generates a signal indicative of an altitude of the drone 302, a GPS sensor that generates a signal indicative of a location of the drone 302 during flight operations, a velocity sensor that generates a signal indicative of a velocity of the drone 302 during flight operations, a rain sensor that generates a signal indicative of whether it is raining, a battery sensor that generates a signal indicative of a percentage of battery power remaining in battery 418, accelerometers that generate signals indicative of an acceleration of drone 302, and gyro-sensors that generate signals indicative of an orientation of drone 302. These signals may be transmitted to drone controller 424, which are then sent to communication module 422 to be transmitted to other elements of the system 400 via network 404.

If drone 302 includes a camera 428, images or video footage captured by camera 428 may be transmitted via communication module 422 to vehicle 100 or remote operating device 408. For example, any images or footage captured by camera 428 may be communicated to vehicle 100 (i.e., to ECU 402 via network 400, or to docking station 304 via network 400 and then to ECU 402 from the docking station 304) to be displayed by GUI 208 on screen 510. Alternatively, if remote operating device 408 includes a display 510, the images or footage captured by camera 428 transmitted to remote operating device 408 via network 404 may be displayed by remote operating device 408. In another alternative, the images and/or video obtained by camera 428 may be stored in memory 431 to be downloaded and viewed later.

Remote operating device 408 may include a remote operating device communication module 434, a GPS module 435, and a remote operating device controller 436. Remote operating device communication module 343 permits remote operating device 408 to communicate with network 404 and other elements of system 400 such as drone 302, docking station 304, and ECU 402. Remote operating device controller 436 may include a drone operating system software stored therein for operating drone 302. Based on inputs received from an operator, remote operating device controller 436 may then communicate instructions to any of drone 302, docking station 304, and ECU 402 via remote operating device communication module 434.

For example, if someone using remote operating device 408 desires to deploy drone 302 from docking station 30, the operator may use remote operating device 408 to send an instruction to docking station 304 via network 404, which then communicates with drone 302 to initiate deployment of drone 302 from docking station 304 (in such a case, it is assumed that panel 108 (FIG. 1) is open or removed.

In another embodiment, the instructions sent from remote operating device 408 to docking station 304 via network 404 may be further communicated to ECU 402. Upon receipt of such an instruction by ECU 402, ECU 402 may communicate with a vehicle sensor 406 such as, for example, a sensor 406 that generates a signal indicative of whether panel 108 is open or removed) to determine whether it is safe for drone 302 to exit the vehicle 100 through the opening 106 formed in roof 104 of vehicle 100. After ECU 402 receives a signal indicative of panel 108 being open or removed so as to not obstruct opening 106, ECU 402 may than communicate a signal back to docking station 304 that permits drone 302 to be deployed an exit vehicle 100 through opening 106.

In other embodiments, ECU 402 may also communicate with other sensors 406 or network 404 to determine whether weather conditions are such that drone 302 may be deployed. For example, if sensor 406 is a rain sensor that communicates a signal indicative of the vehicle 100 being exposed to rain to ECU 402, ECU 402 may transmit an instruction to docking station 304 that prevents drone 302 from being deployed. Alternatively, ECU 402 may communicate with network 404 to retrieve current weather conditions. Based on the information regarding the current weather conditions received from network 404, ECU 402 is configured to send an instruction to docking station 304 that either permits or prevents drone 302 from deploying from docking station 304.

Drone 302 may be any type of drone known to one skilled in the art, provided that drone 302 is sized to fit within vehicle 100. Examples of types of drones include, but are not limited to, a helicopter drone, a fixed-wing drone, a multi-rotary-wing drone, a blimp drone, a flexible-wing drone, and the like. Drone 302 may be capable of both autonomous navigation and operating via remote control.

Figure 5:
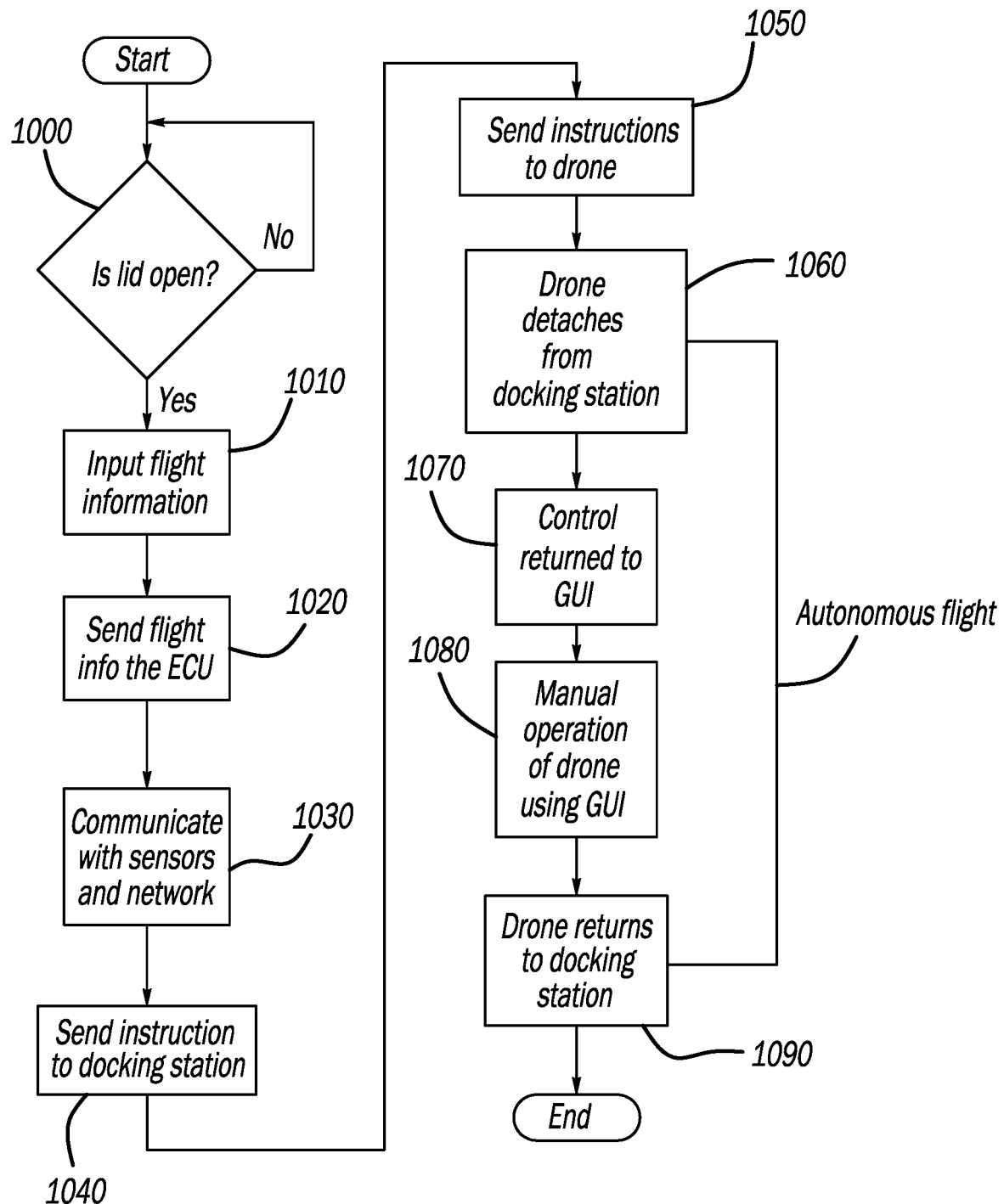
FIG. 5 is a flowchart depicting an example method for controlling a drone using the drone docking system of the present disclosure.

Now referring to FIGS. 5 and 6, a method of operating drone 302 will be described. As noted above, drone 302 may be operated using GUI 208 or remote operating device 408. Description of using GUI 208 to operate drone 302 will first be described. Firstly, if docking station 304 and drone 302 are located within cargo bin 202, lid 306 must be opened (step 1000) by an occupant of vehicle 100 (this step may be omitted if, for example, docking station 304 is located in a rear storage area of vehicle 100 (i.e., if vehicle 100 does not include second or third rows 204, 206 of seats and instead includes a rear storage area)).

After opening lid 305, an occupant may then use GUI 208 to initiate flight operations of drone 302 (step 1010). At this time, an occupant of vehicle 100 may input information into GUI 208 such as, for example, a destination for drone 302 to travel, a desired flight path, a desired altitude for the flight, a time period of the flight, and the like by interacting with various icons 500 (FIG. 6) on a screen 510 of the GUI. At this time, GUI 208 communicates a signal to ECU 402 that drone 302 is to be deployed (step 1020) and that includes the desired information input to the GUI 208 by the occupant.

Upon receipt of this signal and information, ECU 402 communicates with various sensors 406 and/or network 404 to determine whether conditions are acceptable to initiate deployment of drone 302 (step 1030). These conditions include obtaining information relative to current weather conditions from network 404, or obtaining signals from sensors 406 that are indicative of the weather that vehicle 100 is currently being exposed (i.e., a signal indicative of rain from rain sensors or a signal indicative of the vehicle wiper blades being operated, for example). Other conditions include whether the vehicle 100 is in motion, whether the vehicle 100 is at an orientation (i.e., on a slope) that would make it difficult to deploy drone 302 from vehicle 100, and whether panel 108 is open or removed to permit drone 302 to exit the vehicle 100 during flight. If these conditions are satisfactory, ECU 402 may transmit an instruction (step 1040) to docking station 304 to permit drone 302 to begin flight operations, detach from docking station 304, and exit vehicle 100 through opening 106 provided in roof 104 of vehicle 100.

Upon receipt by docking station 304 of instructions from ECU 402, docking station 304 communicates instructions to drone 302 to initiate flight and including the desired flight characteristics input into GUI 208 by the occupant (step 1050). Upon receipt of these instructions, drone 302 may autonomously detach from docking station 304 and exit vehicle 100 through opening 106 (step 1060). At this time, drone 302 may continue to operate autonomously using the desired flight characteristics input by the occupant to GUI 208 before returning to docking station 304.

Alternatively, drone 302 may autonomously detach from docking station 304 and exit vehicle 100 before operation of drone 302 is transferred back to GUI 208 (step 1070). In such a case, drone 302 may exit vehicle 100 and reach a predetermined altitude before operation of drone 302 is transferred back to GUI 208. Then, the occupant can use various control icons on GUI 208 to move in a particular direction, move at a desired velocity, reach a desired altitude, use camera 428, operate light source 430, operate depth detection device 432, and the like (step 1080). At this time, the instructions input into GUI 208 are communicated to ECU 402, which then communicates the instructions to docking station 304, which communicates the instructions to drone 302 via network 404.

If drone 302 is operating autonomously based on instructions input to GUI 208 and the desired flight time has elapsed, drone 302 may then automatically return to vehicle 100, pass through opening 106, and mate with docking station 304 (step 1090). Alternatively, if drone 302 is being manually operated, in step 1090 the occupant can input instructions into GUI 208 that direct drone 302 back to vehicle 100. The occupant can operate drone 302 to reenter vehicle 100 and mate with docking station 304, or the occupant can operate drone 302 to return to a location exterior to vehicle 100 before manually retrieving drone 302 and manually mating drone 302 with docking station 304. It should be understood that if vehicle 100 has moved during flight operations, a location of vehicle 100 can be transmitted to drone 302 via network 404. In this regard, both drone 302 and docking station 304 may include a GPS module 600, 700 that may coordinate with each other.

It should be understood that during flight operations, ECU 402 may continually communicate with network 404 and/or sensors 406 to continually make a determination whether conditions are satisfactory for continuing flight operations (e.g., continually checking weather information). If for whatever reason ECU 402 determines that flight operations should cease, ECU 402 may send an instruction to docking station 304 to have drone 302 return to vehicle 100, which is then communicated to drone 302 using network 404. Moreover, it should be understood that information obtained from drone sensors 426 can be continuously transmitted from drone 302 to docking station 304 and ECU 402 via network 404. If drone sensors 426 generate signals indicative of poor operation (e.g., motor issues, poor flight conditions, and the like), ECU 402 can transmit instructions to docking station 304 that are transmitted to drone 302 via network 404 to cease flight operations and return to vehicle 100.

Figure 7:
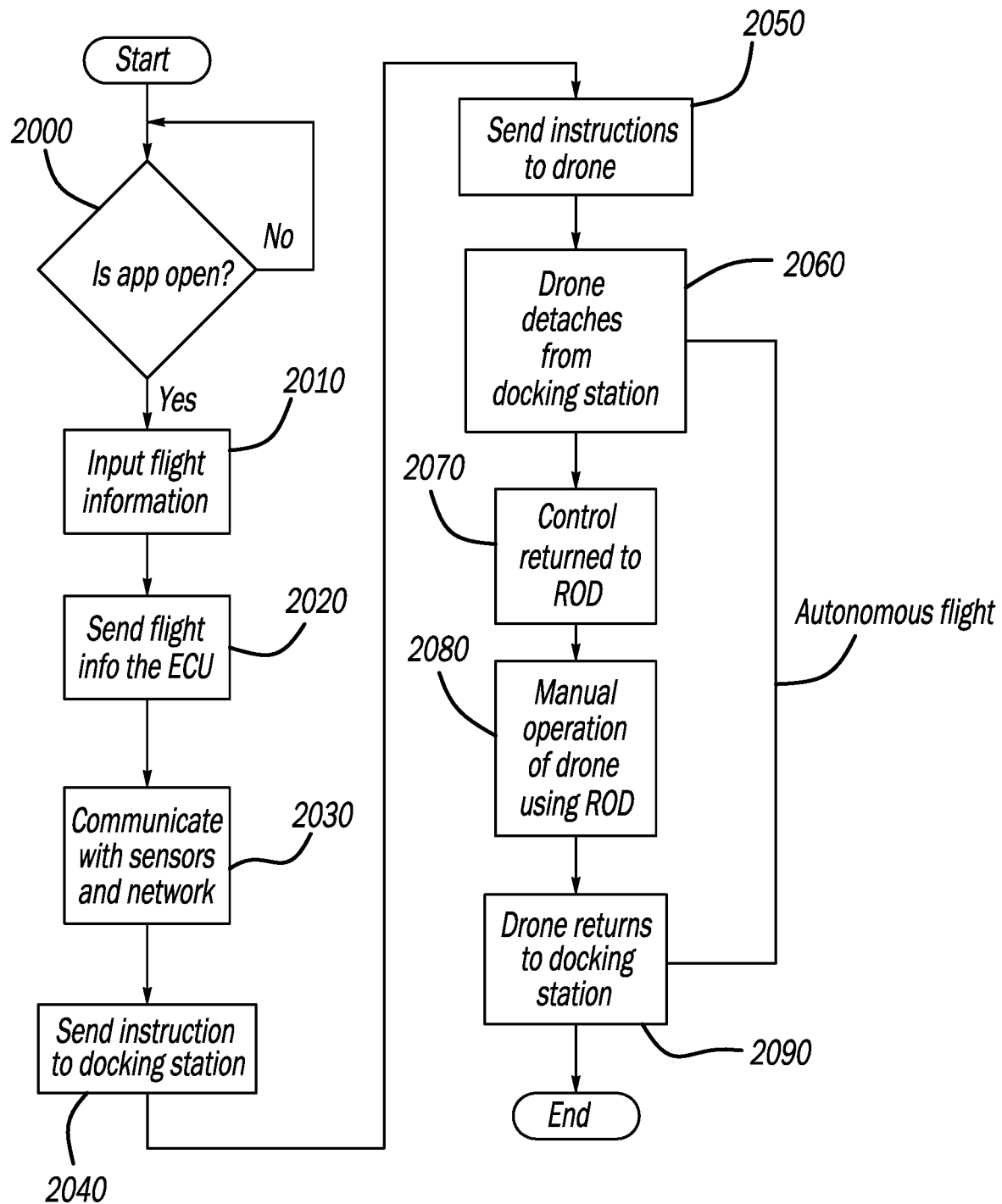
FIG. 7 is a flowchart depicting another example method for controlling a drone using the drone docking system of the present disclosure.

A similar process can be used if drone 302 is being operated by remote operating device 408. It should be understood, however, that use of remote operating device 408 enables an operator of the remote operating device 408 to deploy drone 302 from vehicle 100 if the operator is located at a location remote from vehicle 100. For example, referring to FIG. 7, a control process of operating drone 302 when the operator is located remote from vehicle 100 and plans to control drone 302 using remote operating device 408 is illustrated. In the process of FIG. 7, it should be understood that operator is not located in vehicle 100 when operating drone 302.

First, in step 2000, operator may open up a software program stored on remote operating device 408 that is configured to operate drone 302. After opening the software program, a screen 510 of the remote operating device 408 can display an interface similar to that of GUI 208 (see, e.g., FIG. 6) and, the operator may input various information such as, for example, a destination for drone 302 to travel, a desired flight path, a desired altitude for the flight, a time period of the flight, and the like by interacting with various icons 500 (step 2010; FIG. 6). At this time, remote operating device 408 communicates a signal to either docking station 304 and/or ECU 402 via network 404 that drone 302 is to be deployed (step 2020) and that includes the desired information input to the remote operating device 408 by the operator.

Upon receipt of this signal and information, ECU 402 communicates with various sensors 406 and/or network 404 to determine whether conditions are acceptable to initiate deployment of drone 302 (step 2030). These conditions include obtaining information relative to current weather conditions from network 404, or obtaining signals from sensors 406 that are indicative of the weather that vehicle 100 is currently being exposed (i.e., a signal indicative of rain from rain sensors or a signal indicative of the vehicle wiper blades being operated, for example). Other conditions include whether the vehicle 100 is in motion, whether the vehicle 100 is at an orientation (i.e., on a slope) that would make it difficult to deploy drone 302 from vehicle 100, and whether panel 108 is open or removed to permit drone 302 to exit the vehicle 100 during flight. If these conditions are satisfactory, ECU 402 may transmit an instruction (step 2040) to docking station 304 to permit drone 302 to begin flight operations, detach from docking station 304, and exit vehicle 100 through opening 106 provided in roof 104 of vehicle 100. If panel 108 is obstructing opening 106, ECU 402 can instruct a motor (not shown) that moves panel 108 to move panel 108 so as to not obstruct opening 106 (i.e., controller 402 can open the sunroof, moonroof, or panoramic roof panel).

Upon receipt by docking station 304 of instructions from ECU 402, docking station 304 communicates instructions to drone 302 to initiate flight and including the desired flight characteristics input into remote operating device 408 by the operator (step 2050). Upon receipt of these instructions, drone 302 may autonomously detach from docking station 304 and exit vehicle 100 through opening 106 (step 2060). At this time, drone 302 may continue to operate autonomously using the desired flight characteristics input by the operator to remote operating device 408 before returning to docking station 304. Alternatively, drone 302 may autonomously detach from docking station 304 and exit vehicle 100 before operation of drone 302 is transferred back to remote operating device (ROD) 408 (step 2070). In such a case, drone 302 may exit vehicle 100 and reach a predetermined altitude before operation of drone 302 is transferred back to remote operating device 408. Then, the occupant can use various control icons on the display of remote operating device 408 to move in a particular direction, move at a desired velocity, reach a desired altitude, use camera 428, operate light source 430, operate depth detection device 432, and the like (step 2080). At this time, the instructions input into remote operating device 408 are communicated to ECU 402, which then communicates the instructions to docking station 304, which communicates the instructions to drone 302 via network 404.

If drone 302 is operating autonomously based on instructions input to remote operating device 408 and the desired flight time has elapsed, drone 302 may then automatically return to vehicle 100, pass through opening 106, and mate with docking station 304 (step 2090). Alternatively, if drone 302 is being manually operated by remote operating device 408, in step 2090 the operator can input instructions into remote operating device 408 that direct drone 302 back to vehicle 100. The operator can operate drone 302 to reenter vehicle 100 and mate with docking station 304, or the occupant can operate drone 302 to return to the operator's location exterior to vehicle 100 before manually retrieving drone 302 and manually mating drone 302 with docking station 304 when desired. It should be understood that if vehicle 100 has moved during flight operations, a location of vehicle 100 can be transmitted to drone 302 via network 404. In this regard, both drone 302 and docking station 304 may include a GPS module that may coordinate with each other.

It should be understood that during flight operations, ECU 402 may continually communicate with network 404 and/or sensors 406 to continually make a determination whether conditions are satisfactory for continuing flight operations (e.g., continually checking weather information). If for whatever reason ECU 402 determines that flight operations should cease, ECU 402 may send an instruction to docking station 304 to have drone 302 return to vehicle 100, which is then communicated to drone 302 using network 404. Moreover, it should be understood that information obtained from drone sensors 426 can be continuously transmitted from drone 302 to docking station 304 and ECU 402 via network 404. If drone sensors 426 generate signals indicative of poor operation (e.g., motor issues, poor flight conditions, and the like), ECU 402 can transmit instructions to docking station 304 that are transmitted to drone 302 via network 404 to cease flight operations and return to vehicle 100.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:
a vehicle body defining an interior that includes a front row of seats including a driver's seat and at least one passenger seat, wherein a cargo bin is located between the driver's seat and the at least one passenger seat that has a movable lid to provide and prevent access to the cargo bin;
a vehicle electronic control unit (ECU) located within the interior of the vehicle;
a docking station positioned within the cargo bin and including a docking station controller configured to communicate with the vehicle ECU; and
a drone configured to mate with the docking station, the drone being configured to fly and including a drone controller configured to communicate with the docking station;
wherein the vehicle ECU is configured to communicate instructions to the docking station controller to instruct the drone to disengage from the docking station and perform flight operations, and
wherein the vehicle ECU is configured to communicate instructions to the docking station controller to instruct the drone to cease flight operations and return to and mate with the docking station.

2. The vehicle according to claim 1, wherein the drone includes a battery; and
the docking station is configured to electrically charge the battery when the drone is mated with the docking station.

3. The vehicle according to claim 1, wherein the vehicle comprises a plurality of sensors that communicate various information, including weather information, to the vehicle ECU, and the vehicle ECU is configured to communicate the information to the docking station controller.

4. The vehicle according to claim 3, wherein the docking station controller is configured to determine whether to permit the drone to disengage from the docking station based on the information provided by the sensors and communicated from the vehicle ECU, and determine whether to instruct the drone to cease flight operations and return to and mate with the docking station based on the information provided by the sensors and communicated by the vehicle ECU.

5. The vehicle according to claim 3, wherein the vehicle ECU is further configured to:
determine, based on the weather information received from the plurality of sensors, that it is currently not raining;
send, based on the determination that it is not currently raining, instructions to perform flight operations to the drone controller.

6. The vehicle according to claim 3, wherein the vehicle ECU is further configured to:
determine, based on the information received from the plurality of sensors, that the vehicle is stationary; and
send, based on the determination that the vehicle is stationary, instructions to perform flight operations to the drone controller.

7. The vehicle according to claim 1, wherein the vehicle ECU is configured to communicate with a network and receive weather information from the network, and communicate the weather information to the docking station controller.

8. The vehicle according to claim 7, wherein the docking station controller is configured to determine whether to permit the drone to disengage from the docking station based on the weather information communicated from the vehicle ECU, and determine whether to instruct the drone to cease flight operations and return to and mate with the docking station based on the weather information and communicated by the vehicle ECU.

9. The vehicle according to claim 1, wherein the drone controller is configured to communicate with a remote operating device.

10. The vehicle according to claim 9, wherein the vehicle ECU is configured to communicate with the remote operating device.

11. The vehicle according to claim 1, wherein the vehicle includes a graphic user interface (GUI) that communicates with the vehicle ECU, the GUI being configured to be manipulated by an occupant of the vehicle to instruct the vehicle ECU to communicate with the docking station controller to instruct the drone to perform the flight operations or cease the flight operations.

12. The vehicle according to claim 11, wherein the GUI further includes:
a status element configured to display a drone docking status and a charge level for the battery;
an altitude element configured to receive inputs from a user to instruct the drone to increase or decrease altitude;
a yaw element configured to receive inputs from a user to instruct the drone to roll left or roll right;
a velocity element configured to receive inputs from a user to instruct the drone to increase or decrease speed;
a deployment element configured to receive inputs from a user to instruct the drone to deploy from the docking station; and
a return element configured to receive inputs from a user to instruct the drone to return to the docking station.

13. The vehicle according to claim 1, wherein the interior includes a cargo bin having a movable lid to provide and prevent access to the cargo bin, the docking station being located in the cargo bin.

14. The vehicle according to claim 1, wherein the vehicle body includes an opening that is configured to permit the drone to enter and exit the vehicle.

15. The vehicle according to claim 14, wherein the opening is a sun roof or a moon roof.

16. The vehicle according to claim 1, wherein the vehicle includes a removable roof, and when the roof is removed from the vehicle the drone is permitted to exit and enter the vehicle.

17. A method for operating a drone using the vehicle of claim 1, comprising:
receiving, by the vehicle ECU, a request to initiate the flight operations from either a graphic user interface (GUI) of the vehicle or a remote operating device;
wherein, based on the request received by the vehicle ECU to initiate the flight operations, the ECU is configured to communicate with vehicle sensors to determine whether weather conditions are suitable to conduct the flight operations, and
based on signals generated by the vehicle sensors that are indicative of the weather conditions, the vehicle ECU is configured to communicate instructions to the docking station controller either to permit the drone to conduct the flight operations or prevent the drone from conducting the flight operations.

18. The method of claim 17, wherein after the vehicle ECU receives the request to initiate the flight operations, the method further comprises determining whether the vehicle is in motion and, based on a determination whether the vehicle is in motion, the vehicle ECU is configured to communicate instructions to the docking station controller either to permit the drone to conduct the flight operations or prevent the drone from conducting the flight operations.

* * * * *